(12) United States Patent
Abe et al.

(10) Patent No.: US 10,971,980 B2
(45) Date of Patent: Apr. 6, 2021

(54) ROTOR AND RESOLVER (71) Applicant: MINEBEA MITSUMI Inc., Nagano (JP)

(72) Inventors: Hiroshi Abe, Shizuoka (JP); Takashi Nakagawa, Kanagawa (JP)

(73) Assignee: MINEBEA MITSUMI INC., Nagano (JP)

( * ) Notice: Subject to any disclaimer, the term of this patent is extended or adjusted under 35 U.S.C. 154(b) by 55 days.

(21) Appl. No.: 15/918,360

(22) Filed: Mar. 12, 2018

(65) Prior Publication Data

US 2018/0269762 A1   Sep. 20, 2018

(30) Foreign Application Priority Data

Mar. 17, 2017 (JP) .............................. JP2017-053576

(51) Int. Cl.
| H02K 24/00 | (2006.01) |
| H02K 11/21 | (2016.01) |
| H02K 1/28 | (2006.01) |
| G01D 5/20 | (2006.01) |
| H02K 1/24 | (2006.01) |
| G01D 5/244 | (2006.01) |
| G01D 1/00 | (2006.01) |

(52) U.S. Cl.
CPC ............... *H02K 24/00* (2013.01); *G01D 1/00* (2013.01); *G01D 5/2046* (2013.01); *G01D 5/24442* (2013.01); *H02K 1/246* (2013.01); *H02K 1/28* (2013.01); *H02K 11/21* (2016.01); *H02K 2201/03* (2013.01)

(58) Field of Classification Search
CPC ........ H02K 1/28; H02K 11/21; H02K 11/225; H02K 24/00; H02K 1/24; H02K 1/246; G01D 1/00; G01D 5/2046
USPC ............ 310/216.121, 216.123, 156.09, 68 B
See application file for complete search history.

(56) References Cited

U.S. PATENT DOCUMENTS 6,388,353 B1 * 5/2002 Liu .......................... F04B 13/00
  310/114
2006/0043811 A1 * 3/2006 Ong ....................... H02K 1/278
  310/156.08

(Continued)

FOREIGN PATENT DOCUMENTS

CN    103181063 A    6/2013
JP    2002-174535 A    6/2002

(Continued)

OTHER PUBLICATIONS

JP-2004032943-A (English Translation) (Year: 2004).*

(Continued)

*Primary Examiner* — Quyen P Leung
*Assistant Examiner* — Alexander Moraza
(74) *Attorney, Agent, or Firm* — Pearne & Gordon LLP (57) ABSTRACT

A rotor in one embodiment includes an annular rotor main unit and a fitting portion that extends inward or outward one of an inner circumference and an outer circumference of the rotor main unit to be connected with a rotary shaft. The fitting portion is formed at a position at which a centerline of the fitting portion is offset in parallel with respect to a normal line that is associated with a tangent line of the one of the inner circumference and the outer circumference.

9 Claims, 11 Drawing Sheets

(56) References Cited

U.S. PATENT DOCUMENTS

| | | | |
|---|---|---|---|
| 2010/0013350 A1* | 1/2010 | Fu | H02K 1/28 310/261.1 |
| 2011/0279112 A1* | 11/2011 | Aihara | H02K 24/00 324/207.25 |
| 2012/0256516 A1* | 10/2012 | Matsushita | H02K 1/2766 310/216.123 |
| 2013/0127451 A1* | 5/2013 | Eom | G01D 5/2046 324/207.25 |
| 2013/0293057 A1* | 11/2013 | Naito | H02K 1/28 310/216.123 |
| 2015/0002141 A1* | 1/2015 | Ochiai | H02K 1/246 324/207.16 |

FOREIGN PATENT DOCUMENTS

| | | | |
|---|---|---|---|
| JP | 2002174535 A | * | 6/2002 |
| JP | 2004-032943 A | | 1/2004 |
| JP | 2004032943 A | * | 1/2004 |
| JP | 2006158005 A | * | 6/2006 |
| JP | 4635124 B | | 2/2011 |
| JP | 2013-072673 A | | 4/2013 |
| JP | 2014204495 A | * | 10/2014 |

OTHER PUBLICATIONS

JP-2006158005-A (English Translation) (Year: 2006).*
JP-2014204495-A (English Translation) (Year: 2014).*
JP-2002174535-A (English Translation) (Year: 2002).*
Notice of Reasons for Refusal dated Nov. 24, 2020 for corresponding Japanese Application No. 2017-053576 and English translation.
First Chinese Office Action dated Dec. 21, 2020 for corresponding Chinese Application No. 2018102134051 and English Machine translation.

\* cited by examiner

ROTOR AND RESOLVER

CROSS-REFERENCE TO RELATED APPLICATION(S)

The present application claims priority to and incorporates by reference the entire contents of Japanese Patent Application No. 2017-053576 filed in Japan on Mar. 17, 2017.

BACKGROUND OF THE INVENTION

1. Field of the Invention

The present invention relates to a rotor and a resolver.

2. Description of the Related Art

A resolver is known as a device for detecting an angle of rotation of a rotary electric machine such as a motor and a generator. The resolver typically includes a stator core and a rotor. The stator core includes a plurality of tooth portions extending inward toward the center from an inner circumferential side of an annularly formed stator main unit. The rotor is disposed, on the inside of the stator core, to be opposed to the tooth portions of the stator and mounted on a rotary shaft of the rotary electric machine.

The rotor of the resolver has a protrusion formed on the inside thereof as a lock with respect to the rotary shaft of the rotary electric machine. The protrusion fits in a recess formed as a keyway on the outer circumference of the rotary shaft (see, for example, Japanese Laid-open Patent Publication No. 2002-174535 and Japanese Laid-open Patent Publication No. 2013-072673). Such a recess is formed such that the recess has a centerline aligned with a normal line associated with a tangent line of the outer circumference of the rotary shaft. Thus, the protrusion on the rotor is formed such that the protrusion has a centerline aligned with a normal line associated with a tangent line of the inner circumference of the rotor, so that the protrusion can fit in the recess in the rotary shaft.

In a manufacturing process in which the resolver is mounted on the rotary shaft of the rotary electric machine, however, a wrong type of resolver may be incorrectly mounted on the rotary shaft of the rotary electric machine. In this case, no problem arises, if the wrong type of resolver is completely interchangeable with the correct type of resolver that is to be mounted. If the wrong type of resolver mounted incorrectly has an electrical characteristic different from an electrical characteristic of the correct type of resolver to be originally mounted, however, the resolver may produce a faulty output signal.

Even with a marking system implemented in the manufacturing process to determine the correct type of resolver, a wrong type of resolver may be mounted on the rotary shaft of the rotary electric machine due to failure to check the marking.

SUMMARY OF THE INVENTION

A rotor to be mounted on a rotary shaft of a rotary electric machine according to an embodiment includes an annular rotor main unit, and a fitting portion that extends inward or outward one of an inner circumference and an outer circumference of the rotor main unit to be connected with the rotary shaft. The fitting portion is formed at a position at which a centerline of the fitting portion is offset in parallel with respect to a normal line that is associated with a tangent line of the one of the inner circumference and the outer circumference.

DETAILED DESCRIPTION OF THE PREFERRED EMBODIMENTS

The following details, with reference to the accompanying drawings, embodiments of a rotor and a resolver according to the present invention. The embodiments do not, however, limit the scope of the present invention. In each of the drawings, like or corresponding elements are identified by like reference numerals as appropriate.

First Embodiment

Figure 1:
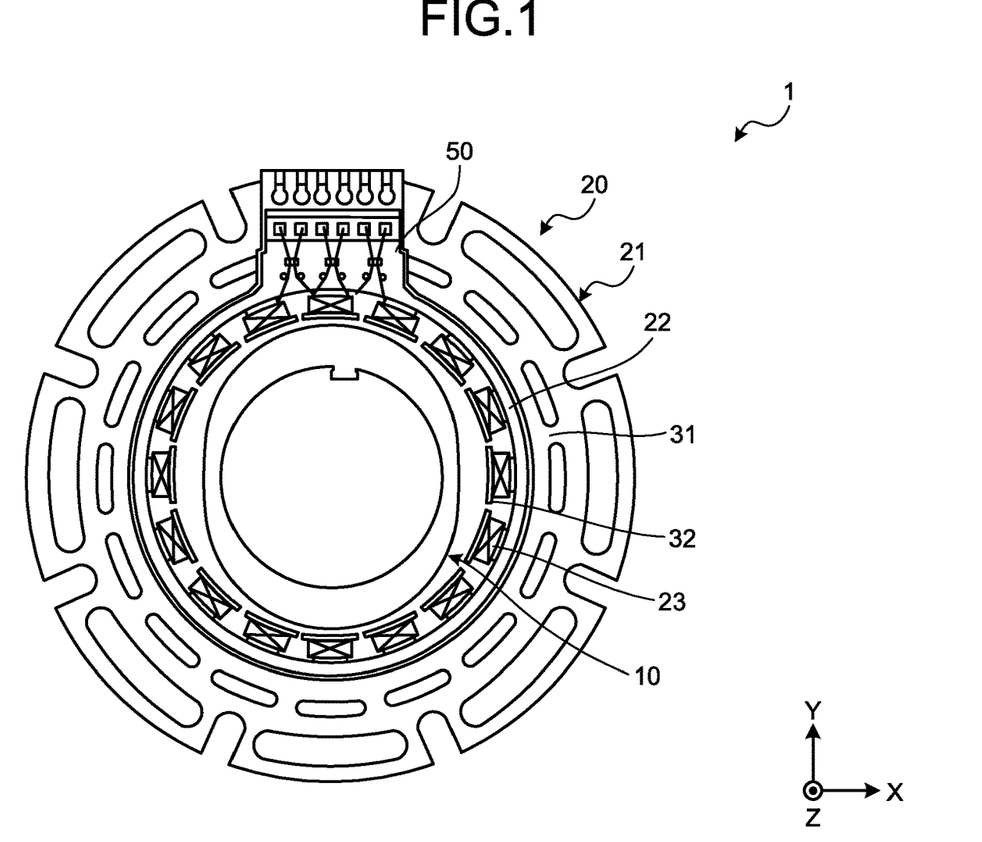
FIG. 1 is a schematic plan view of an exemplary resolver according to a first embodiment.
Figure 2:
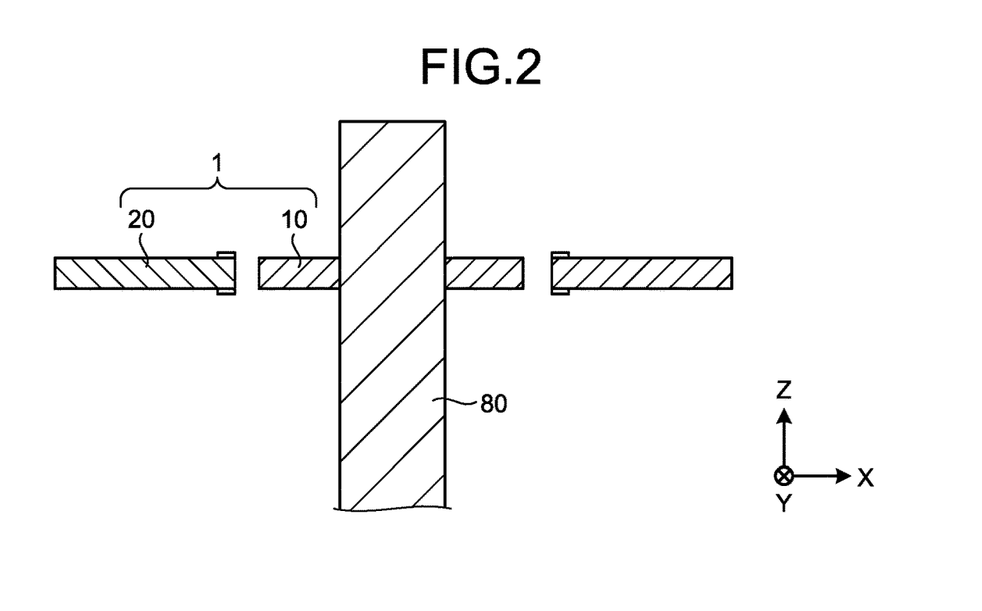
FIG. 2 is a schematic cross-sectional view of an exemplary state in which the resolver according to the first embodiment is mounted in a rotary electric machine.

FIG. 1 is a schematic plan view of an exemplary resolver according to a first embodiment. FIG. 2 is a schematic cross-sectional view of an exemplary state in which the resolver according to the first embodiment is mounted in a rotary electric machine. As illustrated in FIG. 1, this resolver 1 according to the first embodiment is a variable reluctance (VR) resolver including a rotor 10 and a stator 20. The resolver 1 illustrated in FIG. 1 is an inner rotor type in which the rotor 10 is disposed inside the stator 20.

As illustrated in FIG. 2, the rotor 10 is mounted on a rotary shaft 80 of a rotary electric machine and rotates as the rotary shaft 80 rotates. Examples of the rotary electric machine include, but are not limited to, an AC electric motor, an AC generator, and an AC motor generator. The rotor 10 has a configuration to be detailed later.

The stator 20 includes a stator core 21, an insulator 22, and a plurality of stator coils 23. The stator core 21 includes a plurality of cores that are stacked one on top of another in an axial direction. The cores are steel plates formed of a soft magnetic material and subjected to stamping, such as a silicon steel sheet.

The stator core 21 includes an annular stator main unit 31 and a plurality of tooth portions 32 that each extend from an inner circumferential side of the stator main unit 31 toward the center in a radial direction of the stator main unit 31. The tooth portions 32 are disposed equiangularly along a circumferential direction of the stator main unit 31.

The insulator 22 is formed of, for example, an insulating resin. The insulator 22 is formed by insert molding on a partial area including the tooth portions 32 out of a surface of the stator core 21. In addition, a terminal block 50 is integrally molded with the insulator 22. The terminal block 50 extends outwardly in the radial direction of the stator main unit 31.

The stator coils 23 are wound around the respective tooth portions 32 via the insulator 22. The stator coils 23 include a plurality of excitation coils and a plurality of output coils. An excitation current is supplied to the excitation coils from an outside. When the rotary shaft 80 of the rotary electric machine rotates under a condition in which the excitation current is supplied to the excitation coils, the rotor 10 also rotates. As the rotor 10 rotates, sine-phase signals and cosine-phase signals that are 90 degrees phase-shifted from the sine-phase signals are output from the output coils.

Figure 3:
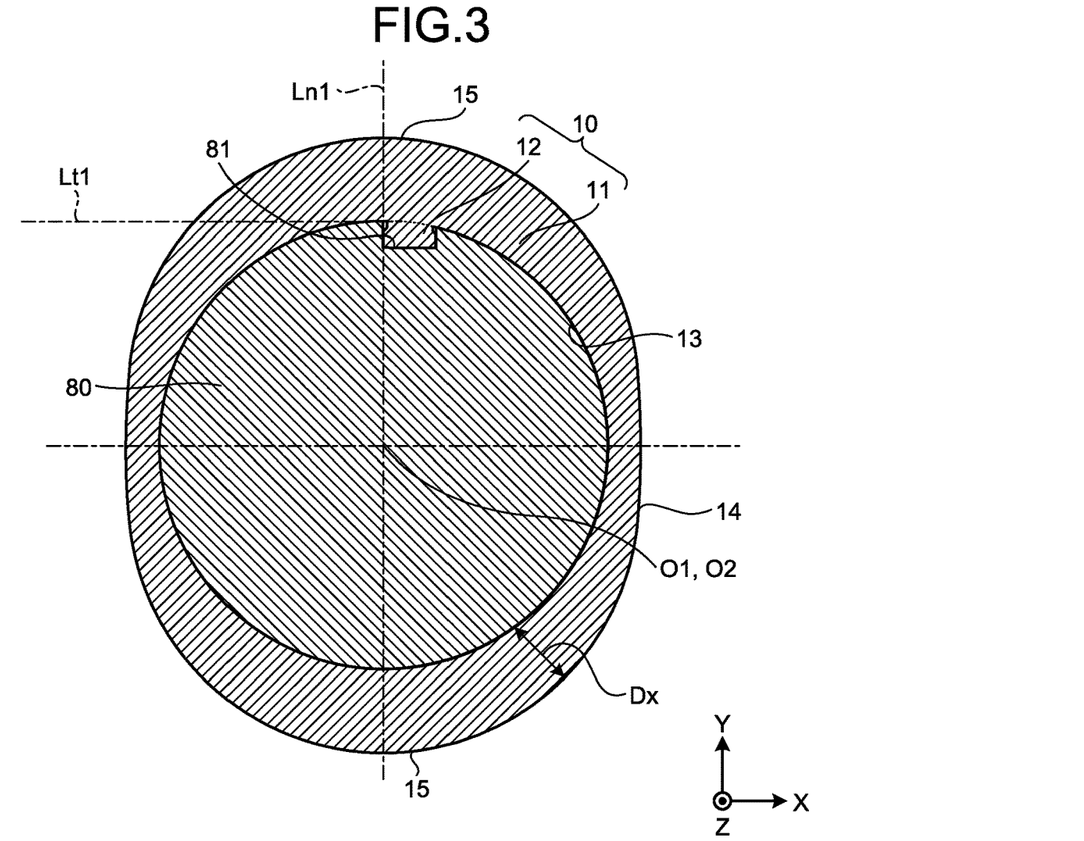
FIG. 3 is a schematic cross-sectional view of a rotor under a condition in which the rotor is exemplarily mounted on a rotary shaft.

FIG. 3 is a schematic cross-sectional view of the rotor 10 under a condition in which the rotor 10 is exemplarily mounted on the rotary shaft 80. As illustrated in FIG. 3, the rotor 10 includes an annular rotor main unit 11 and a protrusion 12. The protrusion 12 protrudes to extend from an inner circumference (inner circumferential circle) 13 of the rotor main unit 11. It is noted that, in FIG. 3 and other drawings, a boundary between the rotor main unit 11 and the protrusion 12 is indicated by a broken line.

The rotor main unit 11 has an outer circumference (outer circumferential circle) 14 that is irregularly shaped with respect to a radial direction. In the example illustrated in FIGS. 1 and 3, the rotor 10 has a number of multiple of 2× and the rotor main unit 11 has protrusions 15 at two places on the outer circumference 14. It is noted that the rotor 10 may have a number of multiple of 1×, or 3× or greater.

As with the stator core 21, the rotor 10 includes a plurality of cores that are stacked one on top of another in the axial direction to integrally form the rotor main unit 11 and the protrusion 12. The cores are steel plates formed of a soft magnetic material and subjected to stamping, such as a silicon steel sheet.

As illustrated in FIG. 3, the protrusion 12 of the rotor 10 is formed as a lock with respect to the rotary shaft 80. The protrusion 12 fits in a recess 81 formed in the rotary shaft 80. The fitting of the protrusion 12 in the recess 81 restricts movement of the rotor 10 in a rotating direction with respect to the rotary shaft 80. This arrangement enables rotation of the rotary shaft 80 to be precisely synchronized with rotation of the rotor 10, so that precision in angular position detection by the resolver 1 can be enhanced.

Additionally, the protrusion 12 of the rotor 10 is formed to be offset in parallel with a normal line Ln1 associated with a tangent line Lt1 of the rotor 10. The recess 81 is formed at a position corresponding to the protrusion 12. Because the protrusion 12 of the rotor 10 cannot be fitted in, for example, a recess in a rotary shaft having a central axis aligned with the normal line Ln1, the rotor 10 can be prevented from erroneously mounted on a rotary shaft that is different from the rotary shaft 80. The following describes the protrusion 12 and the recess 81 in greater detail.

Figure 4:
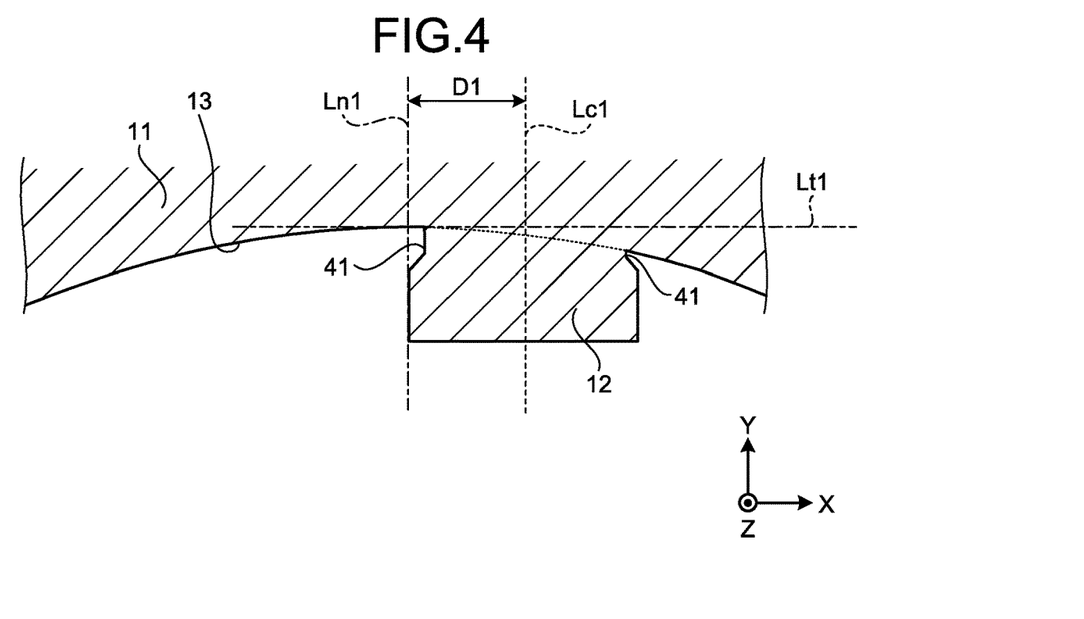
FIG. 4 is an enlarged view of a protrusion of the rotor illustrated in FIG. 3.
Figure 5:
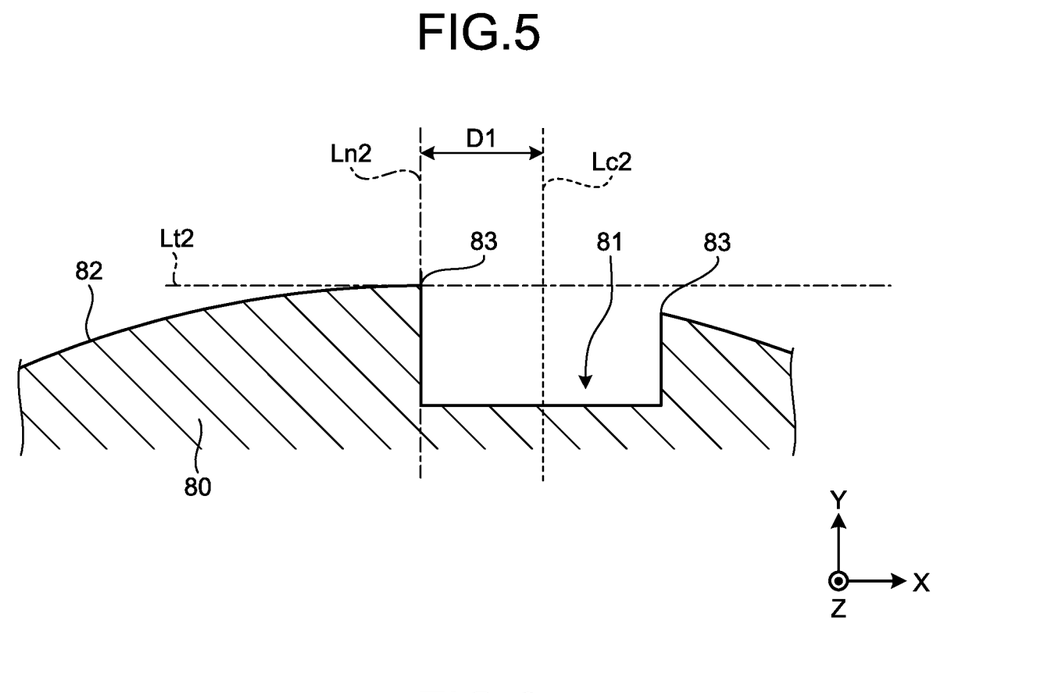
FIG. 5 is an enlarged view of a recess in the rotary shaft illustrated in FIG. 3.

FIG. 4 is an enlarged view of the protrusion 12 of the rotor 10 illustrated in FIG. 3. FIG. 5 is an enlarged view of the recess 81 in the rotary shaft 80 illustrated in FIG. 3. As illustrated in FIG. 4, the protrusion 12 is formed at a position at which a centerline Lc1 is offset by a distance D1 in parallel with respect to the normal line Ln1 that is associated with the tangent line Lt1 of the inner circumference 13 in the rotor main unit 11. Additionally, the protrusion 12 has a proximal end in which clearance notches 41, 41 are formed. The clearance notches 41, 41 are recessed inward the protrusion 12.

In the example illustrated in FIG. 4, the inner circumference 13 of the rotor main unit 11 is formed into a perfect circular shape. Thus, the normal line Ln1 is a straight line that passes through a rotational center O1 (see FIG. 3) of the rotor 10. The centerline Lc1 extends in a direction in which the protrusion 12 extends (Y-axis direction in FIG. 4) and passes through a center in a width direction (X-axis direction in FIG. 4) of the protrusion 12.

The recess 81 in the rotary shaft 80 is a keyway. As illustrated in FIG. 5 and as with the centerline Lc1 of the protrusion 12 in the rotor 10, the recess 81 is formed at a position at which a centerline Lc2 is offset by the distance D1 in parallel with respect to a normal line Ln2 that is associated with a tangent line Lt2 of an outer circumference 82 of the rotary shaft 80. It is here noted that the outer circumference 82 assumes an outer circumferential surface (outer circumferential circle) of the rotary shaft 80 when the recess 81 is not formed.

The outer circumference 82 of the rotary shaft 80 is formed into a perfect circular shape. Thus, the normal line Ln2 is a straight line that passes through a rotational center O2 (see FIG. 3) of the rotary shaft 80. The centerline Lc2 extends in a direction in which the recess 81 extends (Y-axis direction in FIG. 5) and passes through a center in a width direction (X-axis direction in FIG. 5) of the recess 81. The recess 81 is formed to have a width wider than a width of the protrusion 12.

As described above, the centerline Lc1 of the protrusion 12 and the centerline Lc2 of the recess 81 are disposed at a position offset by the distance D1 in parallel with respect to the normal line Ln1 and the normal line Ln2, respectively. Thus, when the rotational center O1 is disposed to overlap the rotational center O2, the centerline Lc1 is aligned with the centerline Lc2, so that the protrusion 12 can be precisely fitted in the recess 81 as illustrated in FIG. 3.

Additionally, the protrusion 12 has the proximal end in which the clearance notches 41, 41 are formed. The clearance notches 41, 41 are recessed inward (in the X-axis direction in FIG. 4) of the protrusion 12. The clearance notches 41, 41 allow interference to be avoided with edges 83, 83 of the recess 81 in the rotary shaft 80 (see FIG. 5).

Figure 6:
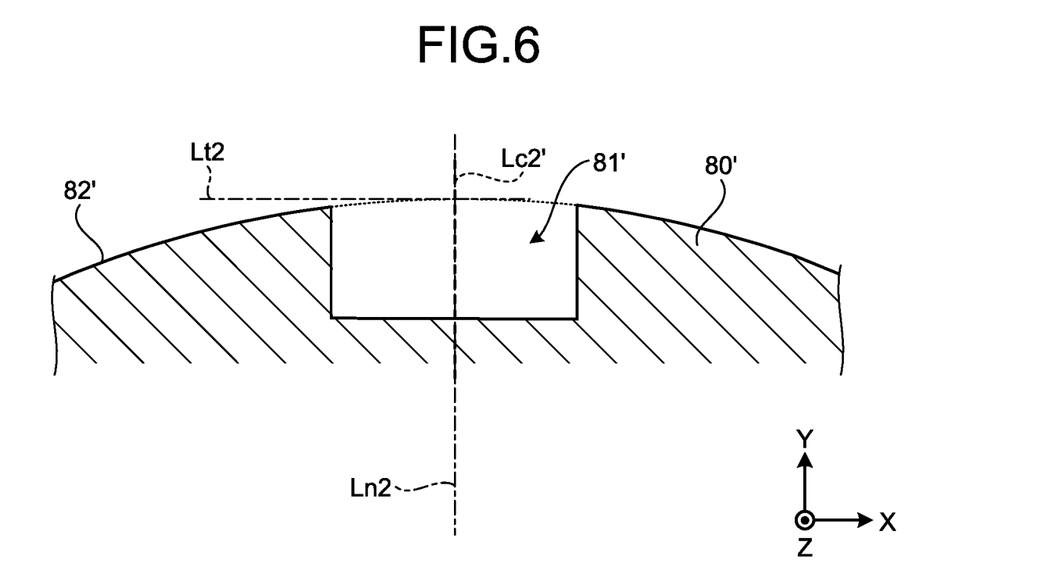
FIG. 6 is a schematic cross-sectional view of part of a rotary shaft having a recess different from the recess illustrated in FIG. 3.
Figure 7:
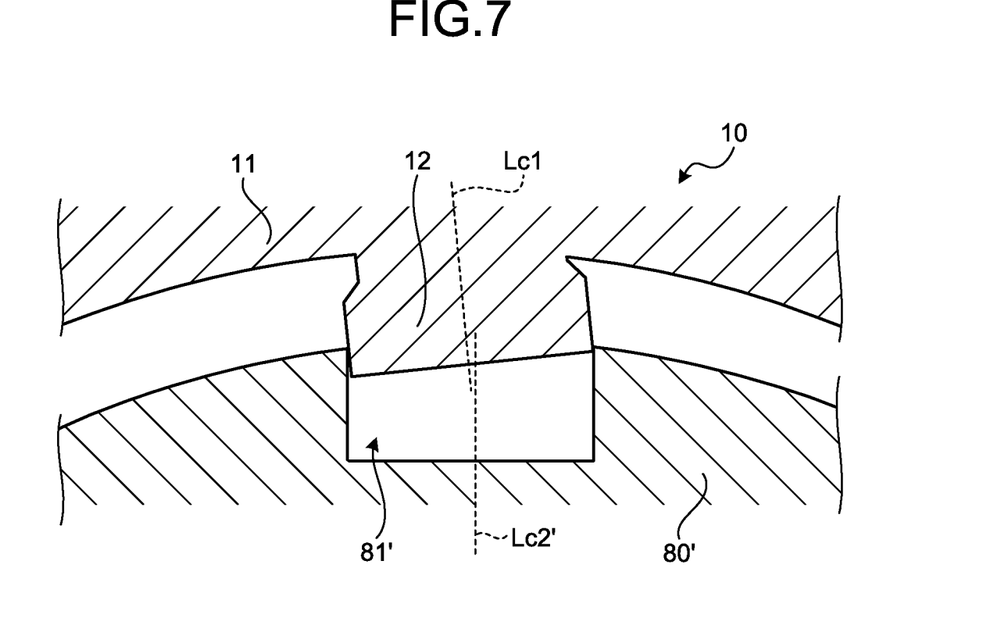
FIG. 7 is an illustration of a relation between the protrusion illustrated in FIG. 4 and the recess in the rotary shaft illustrated in FIG. 6.

Assume a rotary shaft that has a recess having a centerline aligned with the normal line Ln2. FIG. 6 is a schematic cross-sectional view of part of a rotary shaft having a recess different from the recess 81. FIG. 7 is an illustration of a relation between the protrusion 12 of the rotor 10 illustrated in FIG. 4 and the recess in the rotary shaft illustrated in FIG. 6.

As illustrated in FIG. 6, a recess 81' is formed in this rotary shaft 80' such that a centerline Lc2' is aligned with the normal line Ln2 that is associated with the tangent line Lt2 of an outer circumference 82' of the rotary shaft 80'. It is noted that the outer circumference 82' assumes an outer circumferential surface (outer circumferential circle) of the rotary shaft 80' when the recess 81' is not formed. In the example illustrated in FIG. 6, the outer circumference 82' is partially indicated by a broken line.

When an attempt is made to fit the protrusion 12 of the rotor 10 illustrated in FIG. 4 into the recess 81' illustrated in FIG. 6, the centerline Lc1 of the protrusion 12 is inclined with respect to the centerline Lc2' of the recess 81' as illustrated in FIG. 7. The protrusion 12 of the rotor 10 thus cannot be fitted in the recess 81' in the rotary shaft 80'.

Figure 8:
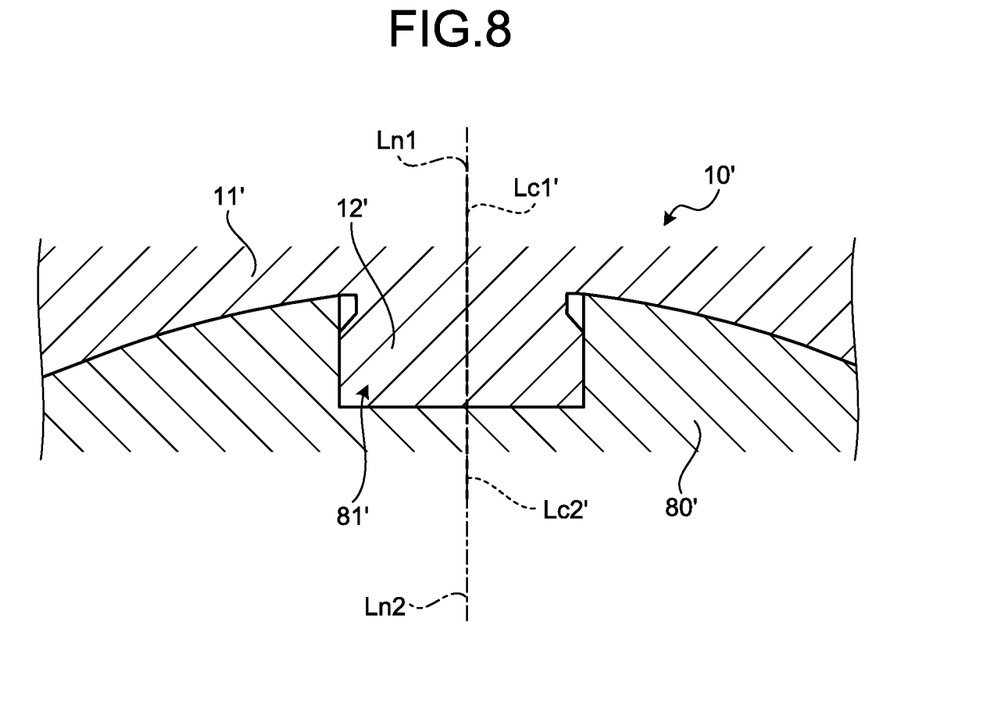
FIG. 8 is a schematic cross-sectional view of a fitting portion between a rotor that has a protrusion and is different from the rotor illustrated in FIG. 4 and the rotary shaft illustrated in FIG. 6.

As described above, the recess 81' in the rotary shaft 80' has the centerline Lc2' aligned with the normal line Ln2. Thus, as illustrated in FIG. 8, the recess 81' in the rotary shaft 80' can fit with a protrusion 12' of a rotor 10' having a centerline Lc1' that is aligned with the normal line Ln1. FIG. 8 is a schematic cross-sectional view of a fitting portion between the rotor 10' that has the protrusion 12' and is different from the rotor 10 and the rotary shaft 80' illustrated in FIG. 6. The protrusion 12' protrudes to extend from an inside of a rotor main unit 11'.

As such, the protrusions 12, 12' have the respective centerlines Lc1, Lc1' disposed to be offset by the distance D1 from each other. The recesses 81, 81' have the respective centerlines Lc2, Lc2' disposed to be offset by the distance D1 from each other. The distance D1 is set to have a length or longer by which the protrusion 12 cannot be fitted in the recess 81' and by which the protrusion 12' cannot be fitted in the recess 81.

Consider, for example, a case in which a process for mounting the resolver 1 including the rotor 10 on a rotary electric machine including the rotary shaft 80 and a process for mounting a resolver including the rotor 10' on a rotary electric machine including the rotary shaft 80' are performed in a single factory or manufacturing line. Even in such a case, a wrong resolver can be prevented from being erroneously mounted on the rotary shaft of the rotary electric machine.

Specifically, the resolver 1 including the rotor 10 can be prevented from being erroneously mounted on the rotary electric machine including the rotary shaft 80', and a resolver including the rotor 10' can be prevented from being erroneously mounted on the rotary electric machine including the rotary shaft 80.

Additionally, the recesses 81, 81' have the respective centerlines Lc2, Lc2' disposed to be offset by the distance D1 from each other. This arrangement enables the recess 81' to be generated by, for example, using a cutting tool identical to a cutting tool (e.g., broach) that has machined a rotary shaft yet to be machined to form the recess 81 and performing machining at a position offset by the distance D1. Thus, even when a plurality of types of resolvers, each having a specific protrusion 12 or protrusion 12', are purchased, the rotary shaft can be easily machined in accordance with the specific type of resolver, so that the cost of the rotary electric machine can be prevented from increasing.

Figure 9:
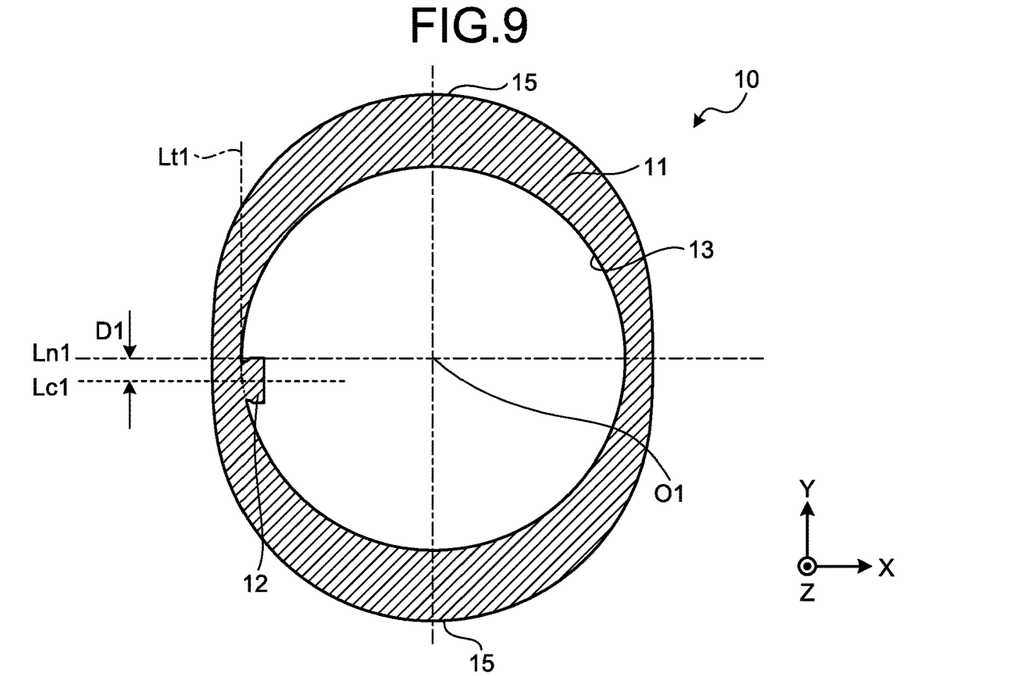
FIG. 9 is a schematic cross-sectional view of an exemplary rotor having a protrusion disposed at a different position.

The position, number, and shape of the protrusion 12 described above are illustrative only and not limiting. For example, the tangent line Lt1 described above is orthogonal to a major diameter direction (Y-axis direction) of the rotor 10 and the normal line Ln1 is aligned with the major diameter direction of the rotor 10. The normal line Ln1 may nonetheless not necessarily have to be aligned with the major diameter direction of the rotor 10. FIG. 9 is a schematic cross-sectional view of an exemplary rotor 10 having the protrusion 12 disposed at a position different from the above-described position.

The protrusion 12 illustrated in FIG. 9 is formed at a position at which the centerline Lc1 is offset by the distance D1 in parallel with respect to the normal line Ln1 that is associated with the tangent line Lt1 of the inner circumference 13 in the rotor main unit 11. The normal line Ln1 illustrated in FIG. 9, however, differs from the normal line Ln1 illustrated in FIG. 4 in that the normal line Ln1 illustrated in FIG. 9 is a straight line extending in a minor diameter direction (X-axis direction) of the rotor 10.

As such the normal line Ln1 extending in parallel with the centerline Lc1 may be a straight line extending in the minor diameter direction of the rotor 10, in addition to the straight line extending in the major diameter direction of the rotor 10. In addition to the straight line extending in the major diameter direction of the rotor 10 and the straight line extending in the minor diameter direction of the rotor 10, the normal line Ln1 may even be inclined at an angle of less than 90 degrees with respect to the major diameter direction or the minor diameter direction.

Figure 10:
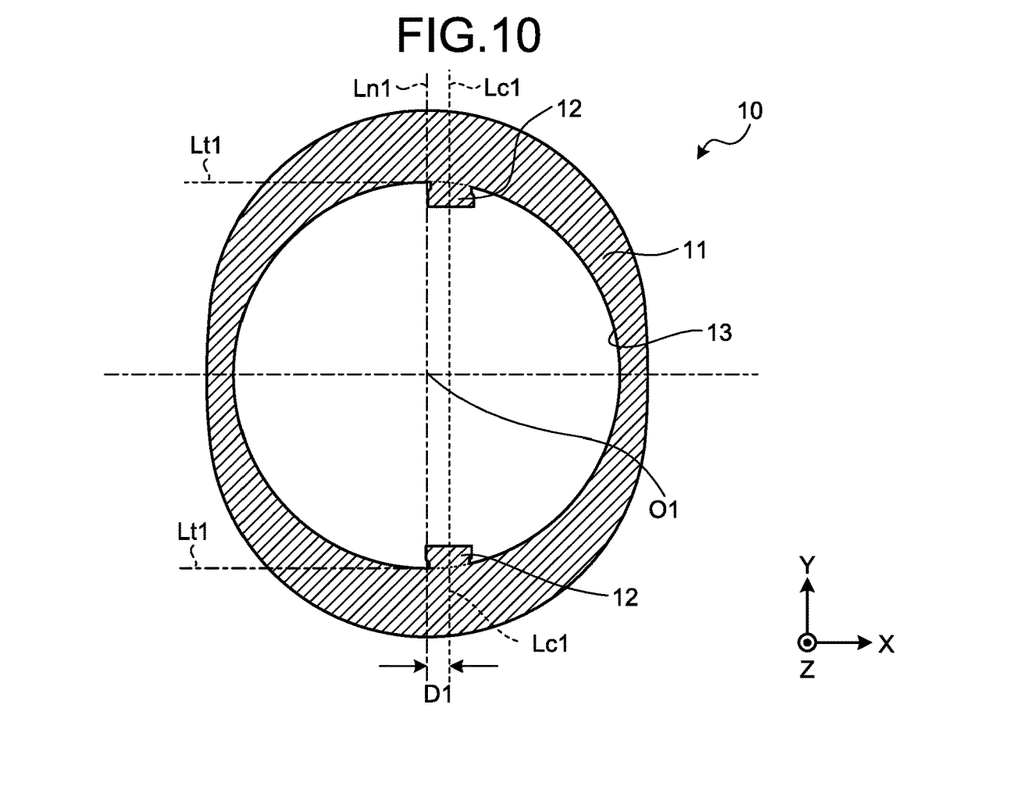
FIG. 10 is a schematic cross-sectional view of an exemplary rotor having a plurality of protrusions.

Although the rotor 10 described above is configured to have one protrusion 12, the rotor 10 may even have a plurality of protrusions 12. FIG. 10 is a schematic cross-sectional view of an exemplary rotor 10 having a plurality of protrusions 12. The rotor 10 illustrated in FIG. 10 has two protrusions 12. The protrusions 12, 12 are formed at positions at which the respective centerlines Lc1, Lc1 are offset in the same direction by the distance D1 with respect to the normal line Ln1.

The rotor 10 illustrated in FIG. 10 has the two protrusions 12 as described above. Consider a case in which the rotary shaft 80' illustrated in FIG. 6 has the single recess 81'. Even when an attempt is made to forcibly insert one of the two protrusions 12 into the recess 81' and the protrusion 12 can be fit thereinto, the other protrusion 12 restricts the insertion of the rotary shaft 80' into the rotor 10. Thus, the resolver 1 including the rotor 10 illustrated in FIG. 10 can be prevented from being erroneously mounted on the rotary electric machine including the rotary shaft 80'.

Figure 11:
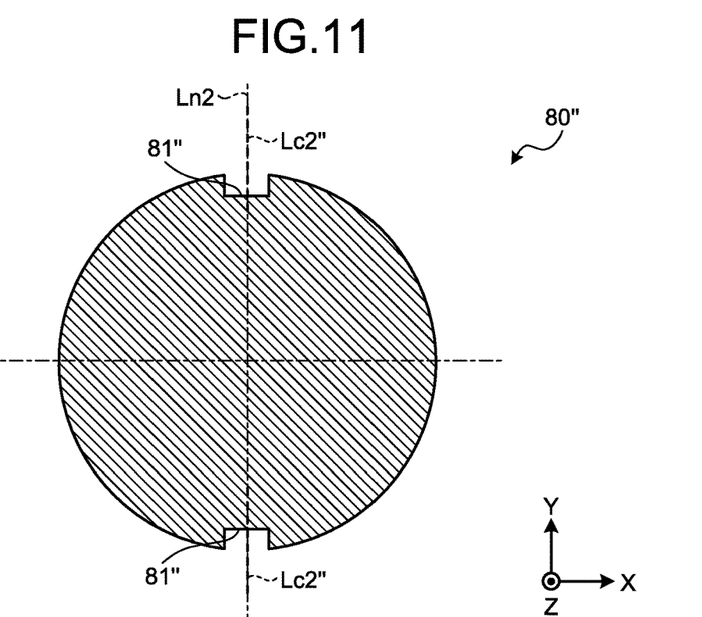
FIG. 11 is a schematic cross-sectional view of an exemplary rotary shaft having a plurality of recesses having centerlines aligned with a normal line.

The two protrusions 12, 12 illustrated in FIG. 10 are formed at positions at which the respective centerlines Lc1, Lc1 are offset in the same direction by the distance D1 with respect to the normal line Ln1. Consider, for example, an arrangement of a rotary shaft 80" in which, as illustrated in FIG. 11, two recesses 81", 81" formed in the rotary shaft 80" have centerlines Lc2", Lc2" aligned with the normal line Ln2. Even with the foregoing arrangement, the two protrusions 12, 12 restrict the insertion of the rotary shaft 80" into the rotor 10. FIG. 11 is a schematic cross-sectional view of an exemplary rotary shaft 80" having a plurality of recesses 81", 81" having the centerlines Lc2", Lc2" aligned with the normal line Ln2. It is noted that the distance D1 is set to have a length or longer by which the protrusion 12 cannot be fitted in the recess 81".

The two protrusions 12, 12 illustrated in FIG. 10 are formed at positions at which the respective centerlines Lc1, Lc1 are offset in the same direction by the distance D1 with respect to the normal line Ln1. Thus, even when the distance D1 is small, the insertion of the rotary shaft 80" into the rotor 10 can be precisely restricted. It is noted that the two protrusions 12, 12 may be formed at positions such that the centerlines Lc1, Lc1 are offset in opposite directions by the distance D1.

In the example described above, the two protrusions 12, 12 have the respective centerlines Lc1, Lc1 offset by the distance D1 in parallel with respect to the normal line Ln1. An amount of offset of one of the centerlines Lc1 with respect to the normal line Ln1 may, however, be different from an amount of offset of the other of the centerlines Lc1 with respect to the normal line Ln1.

Figure 12:
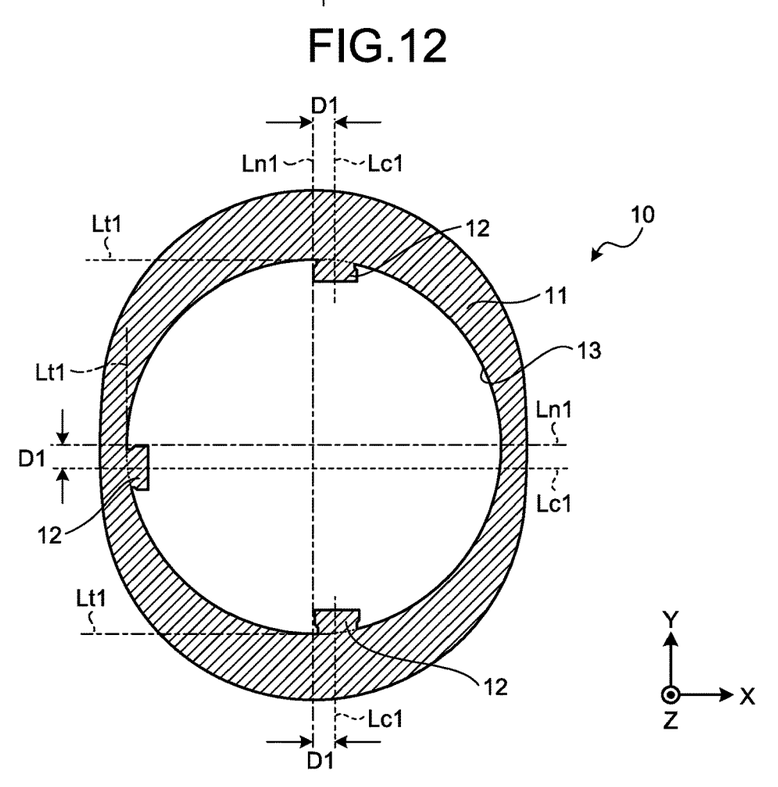
FIG. 12 is a schematic cross-sectional view of another exemplary rotor having a plurality of protrusions.

Although the example illustrated in FIG. 10 describes the rotor 10 having the two protrusions 12, the rotor 10 may have three or more protrusions 12. FIG. 12 is a schematic cross-sectional view of another exemplary rotor 10 having a plurality of protrusions 12. The rotor 10 illustrated in FIG. 12 has three protrusions 12, 12, 12. The three protrusions 12, 12, 12 are formed such that respective centerlines Lc1, Lc1, Lc1 are offset by the distance D1 with respect to the normal line Ln1. In this case, too, the amount of offset with respect to the normal line Ln1 may vary among the three centerlines Lc1, Lc1, Lc1.

Figure 13:
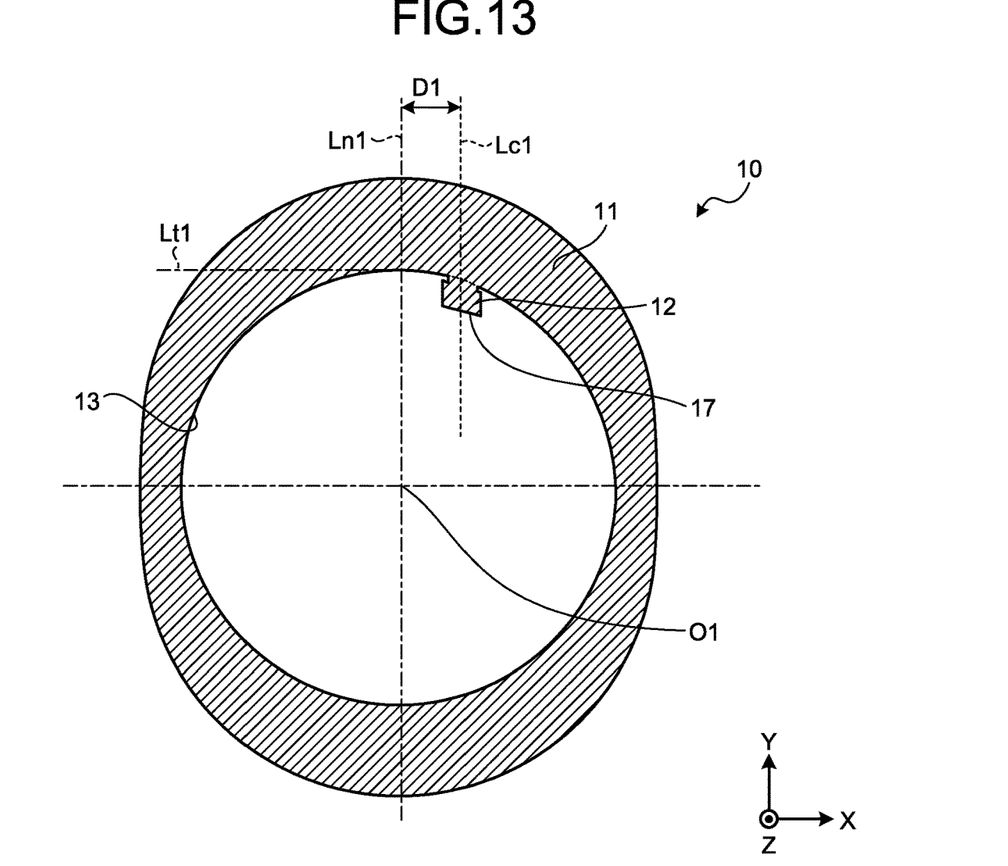
FIG. 13 is a schematic cross-sectional view of an exemplary rotor having a protrusion that has a different distal end shape.

The protrusion 12 described above has a distal end formed to extend in a direction orthogonal to the centerline Lc1. The shape of the distal end of the protrusion 12 is, however, illustrative only and not limiting. FIG. 13 is a schematic cross-sectional view of an exemplary rotor 10 having a protrusion 12 that has a distal end shape different from the distal end shape described above. The protrusion 12 illustrated in FIG. 13 has a distal end 17. The distal end 17 is formed to extend in a direction crossing, but not orthogonal to, the centerline Lc1.

Figure 14:
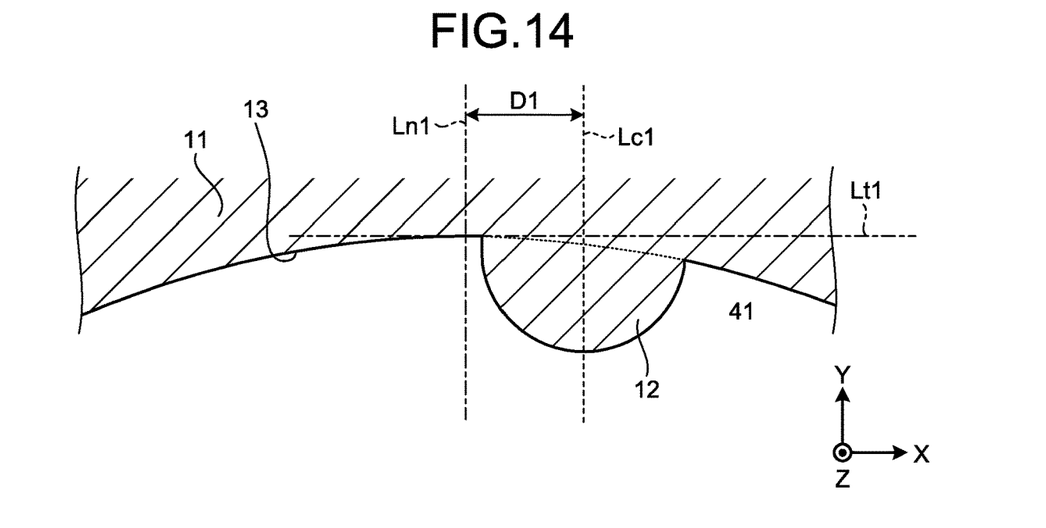
FIG. 14 is a schematic cross-sectional view of an exemplary rotor having a protrusion that has a different shape.

The protrusion 12 described above has a quadrilateral shape in a cross-sectional view. The shape of the protrusion 12 is not, however, limited to the quadrilateral. FIG. 14 is a schematic cross-sectional view of an exemplary rotor 10 having a protrusion 12 that has a shape different from the above-described shape. The protrusion 12 illustrated in FIG. 14 has an arcuate (semi-circular) shape in a cross-sectional view. The protrusion 12 may even have a trapezoidal or rhombus shape in a cross-sectional view.

It is noted that the foregoing examples have been described for an arrangement in which the inner circumference 13 of the rotor main unit 11 and the outer circumference 82 of the rotary shaft 80 are each formed into a perfect circular shape. Nonetheless, the inner circumference 13 of the rotor main unit 11 and the outer circumference 82 of the rotary shaft 80 are required only to have a shape that corresponds to each other. The inner circumference 13 of the rotor main unit 11 and the outer circumference 82 of the rotary shaft 80 may be shaped into, for example, an ellipse.

As described above, the rotor 10 of the resolver 1 according to the first embodiment includes the annular rotor main unit 11 and the protrusion 12. The protrusion 12 protrudes to extend from the inner circumference 13 of the rotor main unit 11 and fits in the recess 81 formed in the rotary shaft 80. The protrusion 12 assumes a fitting portion to be connected with the rotary shaft 80. The protrusion 12 is formed at a position at which the centerline Lc1 is offset in parallel with respect to the normal line Ln1 that is associated with the tangent line Lt1 of the inner circumference 13 of the rotor main unit 11. The foregoing arrangement can prevent the resolver 1 from being erroneously mounted on the rotary shaft 80' (see FIG. 6) that has the recess 81' having the centerline Lc2' aligned with the normal line Ln2.

The rotor 10 of the resolver 1 may also have a plurality of protrusions 12. This arrangement can prevent even more reliably the resolver 1 from being erroneously mounted on the rotary shaft 80' that has the recess 81' having the centerline Lc2' aligned with the normal line Ln2.

Additionally, the protrusions 12, 12 are formed at positions at which the respective centerlines Lc1, Lc1 are offset in the same direction with respect to the normal line Ln1. This arrangement can prevent even more reliably the resolver 1 from being erroneously mounted on the rotary shaft 80" (see FIG. 11) that has the recesses 81", 81" having the centerline Lc2" aligned with the normal line Ln2.

The recess 81 formed in the rotary shaft 80 is formed at a position at which the centerline Lc2 is offset in parallel with respect to the normal line Ln2 that is associated with the tangent line Lt2 of the outer circumference 82 of the rotary shaft 80. This arrangement enables the protrusion 12 of the rotor 10 to be precisely fitted in the recess 81 in the rotary shaft 80.

Second Embodiment

A resolver according to the second embodiment differs from the inner rotor type resolver 1 according to the first embodiment in that the resolver in the second embodiment is an outer rotor type.

Figure 15:
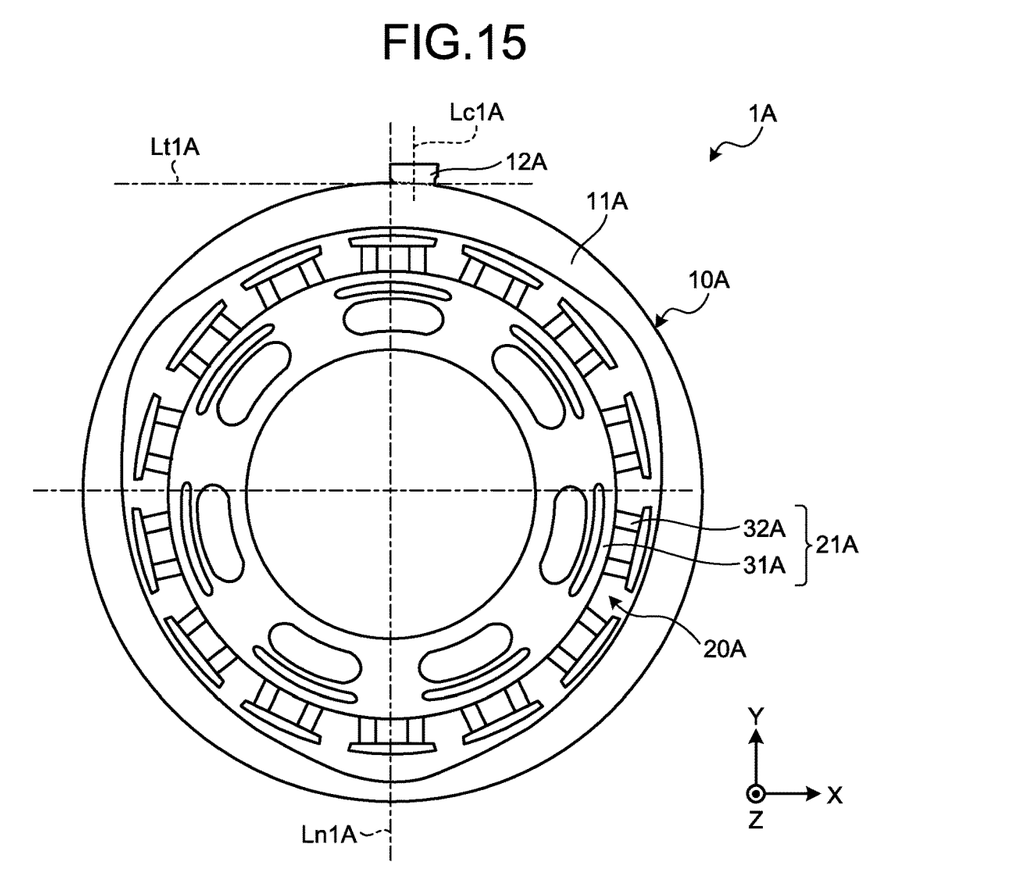
FIG. 15 is a schematic plan view of a resolver according to a second embodiment.

FIG. 15 is a schematic plan view of the resolver according to the second embodiment. As illustrated in FIG. 15, this resolver 1A in the second embodiment is a VR resolver including a rotor 10A and a stator 20A. The rotor 10A is disposed outside the stator 20A.

As with the rotor 10, the rotor 10A is connected with a rotary shaft of a rotary electric machine and rotates as the rotary shaft rotates. The rotor 10A has an inner circumferential surface that is irregularly shaped with respect to a radial direction. The rotor 10A of the resolver 1A illustrated in FIG. 15 is illustrated so as to have protrusions at three places on the inner circumferential surface and to have a shaft angle multiplier of 3×. The rotor 10A may nonetheless have a shaft angle multiplier of 2× or less, or 4× or greater. Again as with the rotor 10, the rotor 10A includes a plurality of cores that are stacked one on top of another in the axial direction.

The stator 20A includes a stator core 21A. As with the stator core 21, the stator core 21A includes a plurality of cores that are stacked one on top of another in the axial direction. The stator core 21A includes an annular stator main unit 31A and a plurality of tooth portions 32A that each extend from an outer circumferential side of the stator main unit 31A toward the outside in a radial direction of the stator main unit 31A. As with the tooth portions 32, stator coils not illustrated are wound around the respective tooth portions 32A via an insulator not illustrated.

Figure 16:
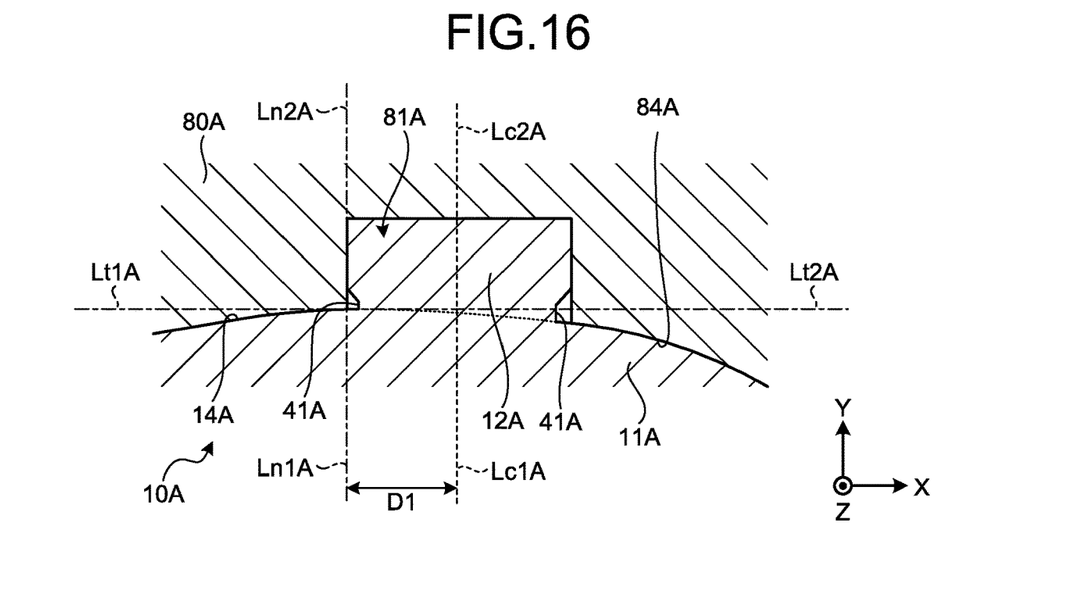
FIG. 16 is a schematic cross-sectional view of a fitting portion between a rotor and a rotary shaft illustrated in FIG. 15.

FIG. 16 is a schematic cross-sectional view of a fitting portion between the rotor 10A and the rotary shaft of the rotary electric machine. As illustrated in FIG. 16, the rotor 10A is formed such that a centerline Lc1A is offset by a distance D1 in parallel with respect to a normal line Ln1A that is associated with a tangent line Lt1A of an outer circumference 14A of a rotor main unit 11A.

The centerline Lc1A extends in a direction in which a protrusion 12A extends (Y-axis direction) and passes through a center in a width direction (X-axis direction) of the protrusion 12A. Additionally, the protrusion 12A has a proximal end in which clearance notches 41A, 41A are formed. The clearance notches 41A, 41A are recessed inward the protrusion 12A. The outer circumference 14A of the rotor main unit 11A is formed into a perfect circular shape. It is noted that, in FIG. 16, a boundary between the rotor main unit 11A and the protrusion 12A is indicated by a broken line.

A rotary shaft 80A has a recess 81A. The recess 81A is a keyway. As illustrated in FIG. 16, the recess 81A is formed at a position at which, as with the centerline Lc1A of the protrusion 12A in the rotor 10A, a centerline Lc2A is offset by the distance D1 in parallel with a normal line Ln2A that is associated with a tangent line Lt2A of an inner circumference 84A of the rotary shaft 80A. The recess 81A is formed to have a width (in the example illustrated in FIG. 16, a length in the X-axis direction) that is wider than a width of the protrusion 12A. Additionally, the inner circumference 84A of the rotary shaft 80A is formed into a perfect circular shape.

Thus, as with the resolver 1 of the first embodiment, the resolver 1A including the rotor 10A can be prevented from being erroneously mounted on a rotary electric machine including a rotary shaft having a recess that has a centerline aligned with the normal line Ln2A.

It is noted that, as with the position, number, and shape of the protrusion 12 described above, various changes may be made in the position, number, and shape of the protrusion 12A in the second embodiment. For example, the rotor 10A may have a plurality of protrusions 12A. The protrusions 12A, 12A may be formed at positions at which respective centerlines Lc2A, Lc2A are offset with respect to the normal line Ln2A in the same direction.

Additionally, the normal line Ln2A described above is a straight line extending in a major diameter direction of the rotor 10A. The normal line Ln2A may nonetheless be a straight line extending in a minor diameter direction of the rotor 10A or inclined at less than 90 degrees from the minor diameter direction. The outer circumference 14A of the rotor 10A and the inner circumference 84A of the rotary shaft 80A are required only to have a shape that corresponds to each other. The outer circumference 14A of the rotor 10A and the inner circumference 84A of the rotary shaft 80A may be shaped into an ellipse.

As described above, the rotor 10A according to the second embodiment includes the annular rotor main unit 11A and the protrusion 12A. The protrusion 12A protrudes to extend from the outer circumference 14A of the rotor main unit 11A and fits in the recess 81A formed in the rotary shaft 80A. The protrusion 12A assumes a fitting portion to be connected with the rotary shaft 80A. The protrusion 12A is formed at a position at which the centerline Lc1A is offset in parallel with respect to the normal line Ln1A that is associated with the tangent line Lt1A of the outer circumference 14A of the rotor main unit 11A. The foregoing arrangement can prevent the resolver 1A from being erroneously mounted on a rotary shaft that has a recess having a centerline aligned with the normal line Ln2.

Third Embodiment

A rotor of a resolver according to a third embodiment differs from the rotor 10 of the resolver 1 according to the first embodiment in that, whereas the rotor 10 in the first embodiment has the protrusion 12 to be fitted in the rotary shaft 80, the rotor in the third embodiment has a recess with which the rotary shaft 80 is connected. The resolver in the third embodiment, excepting the rotor, is configured similarly to the resolver 1 in the first and second embodiments and the description for the similar configurations will be omitted.

Figure 17:
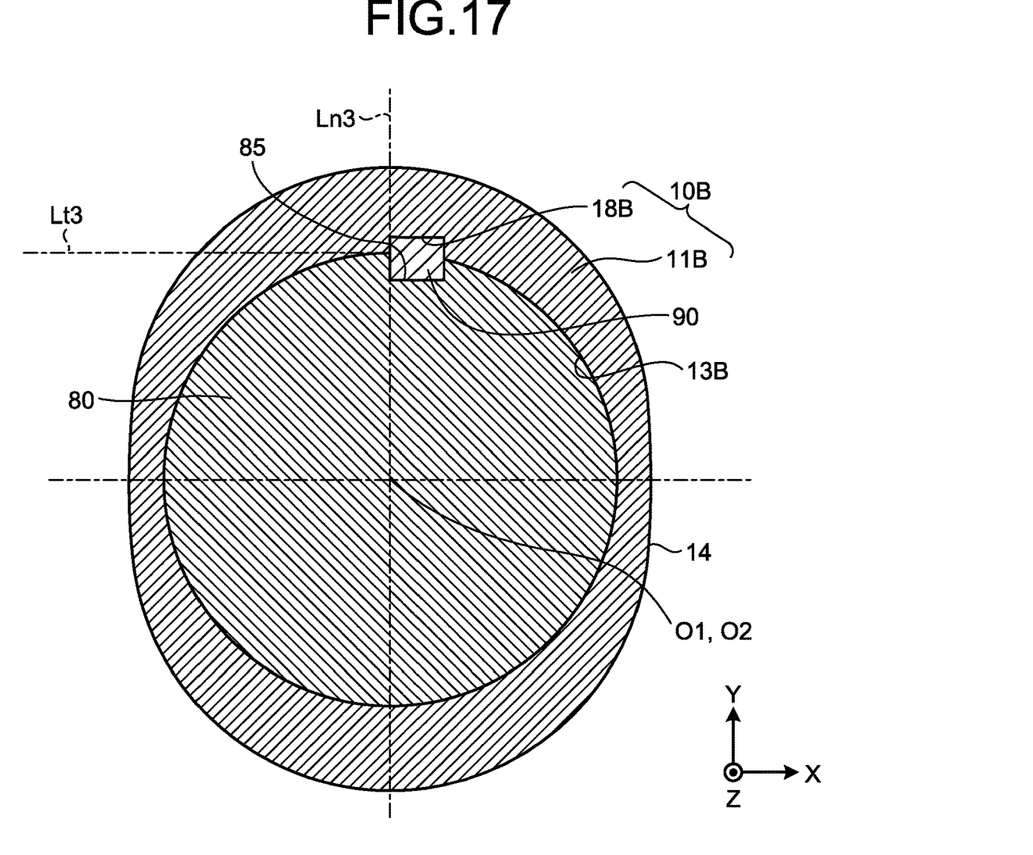
FIG. 17 is a schematic cross-sectional view of an exemplary rotor of a resolver according to a third embodiment.

FIG. 17 is a schematic cross-sectional view of an exemplary rotor of the resolver according to the third embodiment. The example illustrated in FIG. 17 illustrates the schematic cross-section of a rotor 10B mounted on the rotary shaft 80.

As illustrated in FIG. 17, the rotor 10B includes an annular rotor main unit 11B and has a recess 18B. The recess 18B extends inward an inner circumference (inner circumferential circle) 13B of the rotor main unit 11B. It is here noted that the inner circumference 13B assumes an inner circumferential surface (inner circumferential circle) of the rotor main unit 11B when the recess 18B is not formed.

Figure 18:
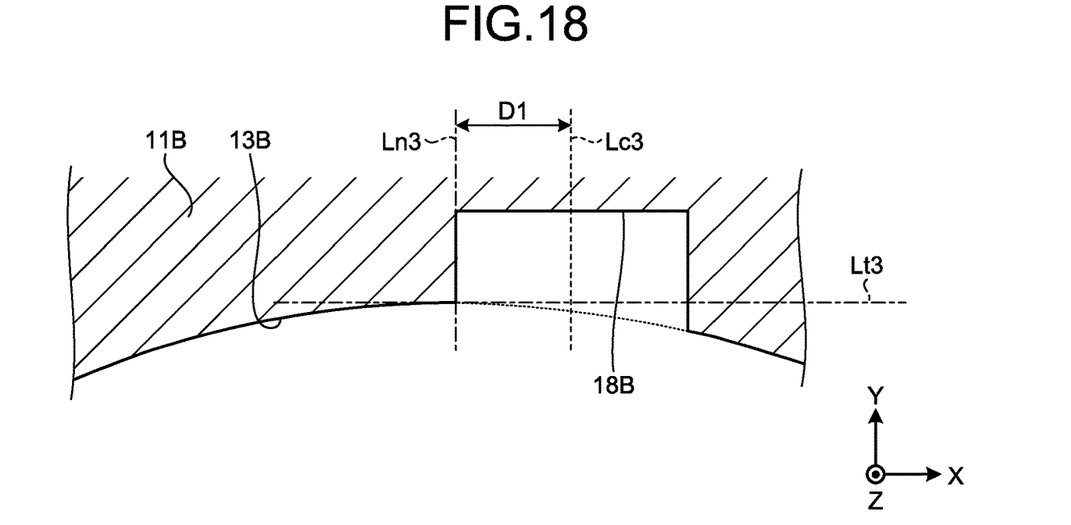
FIG. 18 is an enlarged view of a recess in the rotor illustrated in FIG. 17.

FIG. 18 is an enlarged view of the recess 18B in the rotor 10B illustrated in FIG. 17. As illustrated in FIG. 18, the recess 18B is a keyway that is formed at a position at which a centerline Lc3 is offset by a distance D1 in parallel with respect to a normal line Ln3 that is associated with a tangent line Lt3 of the inner circumference 13B in the rotor main unit 11B.

The inner circumference 13B of the rotor main unit 11B is formed into a perfect circle and the normal line Ln3 is a straight line that passes through a rotational center O1 (see FIG. 17) of the rotor 10B. Additionally, the centerline Lc3 extends in a direction in which the recess 18B extends (Y-axis direction in FIG. 18) and passes through a center in a width direction (X-axis direction in FIG. 18) of the recess 18B.

As described previously, the recess 81 in the rotary shaft 80 is formed at a position at which the centerline Lc2 is offset by the distance D1 in parallel with respect to the normal line Ln2 that is associated with the tangent line Lt2 of the outer circumference 82 of the rotary shaft 80, as with the centerline Lc1 of the protrusion 12 in the rotor 10 (see FIG. 5). As illustrated in FIG. 17, a key 90 is inserted in the recess 81 in the rotary shaft 80. The key 90 has a quadrilateral cross-sectional shape. The key 90 may nonetheless have a circular, rhombus, or elliptic cross-sectional shape.

Thus, when the rotational center O1 is disposed to overlap the rotational center O2, the centerline Lc3 is aligned with the centerline Lc2. The foregoing results in, as illustrated in FIG. 17, the recess 18B facing the recess 81, so that connection can be made via the key 90. Thus, the rotor 10B can be precisely connected with the rotary shaft 80 having the key 90 inserted in the recess 81.

Additionally, a resolver 1B including the rotor 10B can be prevented from being erroneously mounted on a rotary electric machine that includes a rotary shaft in which a recess having a centerline aligned with the normal line Ln2 is formed, as with the resolver 1 according to the first embodiment.

It is noted that, as with the protrusion 12 described previously, various changes can be made with the recess 18B. For example, the position, number, and shape of the recess 18B may be changed as with the position, number, and shape of the protrusion 12 described above.

As described above, the rotor 10B in the third embodiment includes the annular rotor main unit 11B and has the recess 18B. The recess 18B extends inward the rotor main unit 11B from the inner circumference 13B of the rotor main unit 11B. The key 90 disposed in the recess 81 in the rotary shaft 80 fits in the recess 18B. The recess 18B is formed at a position at which the centerline Lc3 is offset in parallel with respect to the normal line Ln3 that is associated with the tangent line Lt3 of the inner circumference 13B in the rotor main unit 11B. The foregoing arrangements prevent the resolver 1B from being erroneously mounted, using the key 90, on the rotary shaft that has a recess having a centerline aligned with the normal line Ln2.

Fourth Embodiment

A rotor of a resolver according to a fourth embodiment differs from the rotor 10A of the resolver 1A according to the second embodiment in that, whereas the rotor 10A in the second embodiment has the protrusion 12A to be fitted in the rotary shaft 80A, the rotor in the fourth embodiment has a recess with which the rotary shaft 80A is connected, as with the rotor 10B in the third embodiment. The resolver in the fourth embodiment, excepting the rotor, is configured similarly to the resolver 1A in the second embodiment and the description for the similar configurations will be omitted.

Figure 19:
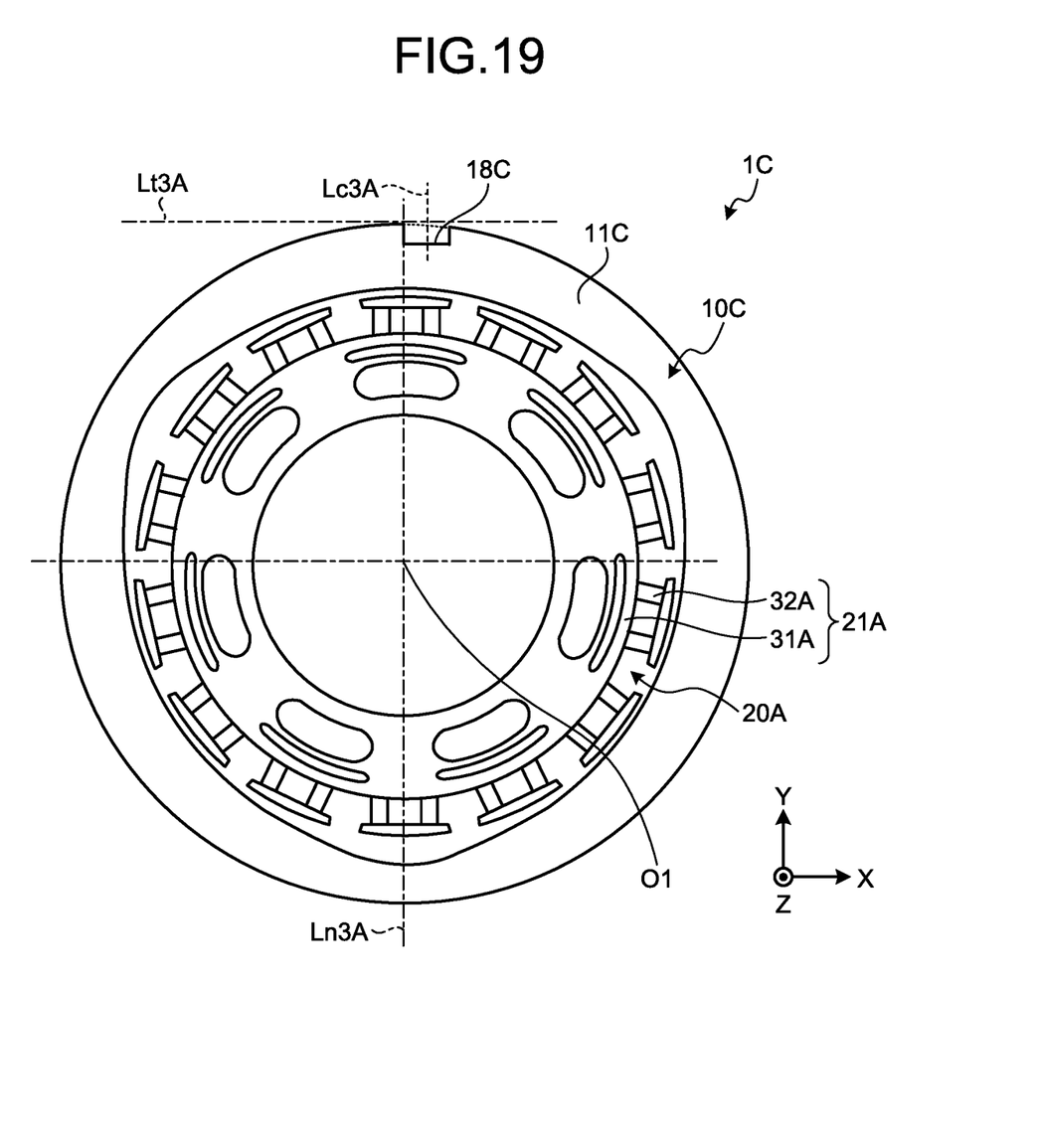
FIG. 19 is a schematic plan view of a resolver according to a fourth embodiment.

FIG. 19 is a schematic plan view of this resolver 1C according to the fourth embodiment. A rotor 10C illustrated in FIG. 19 is, as with the rotor 10A, connected with a rotary shaft of a rotary electric machine and rotates as the rotary shaft rotates. As with the rotor 10A, the rotor 10C has an inner circumferential surface that is irregularly shaped with respect to a radial direction.

The rotor 10C includes a rotor main unit 11C and has a recess 18C. The recess 18C extends inward the rotor main unit 11C from an outer circumference 14C of the rotor main unit 11C. A key 90 disposed in a recess 81A in a rotary shaft 80A fits in the recess 81A. It is here noted that the outer circumference 14C assumes an inner circumferential surface (inner circumferential circle) of the rotor main unit 11C when the recess 18C is not formed.

The recess 81A in the rotary shaft 80A is formed at a position at which a centerline Lc2A is offset, as with a centerline Lc3A of the recess 18C in the rotor 10C, by a distance D1 in parallel with respect to a normal line Ln2A that is associated with a tangent line Lt2A of an inner circumference 84A of the rotary shaft 80A.

Figure 20:
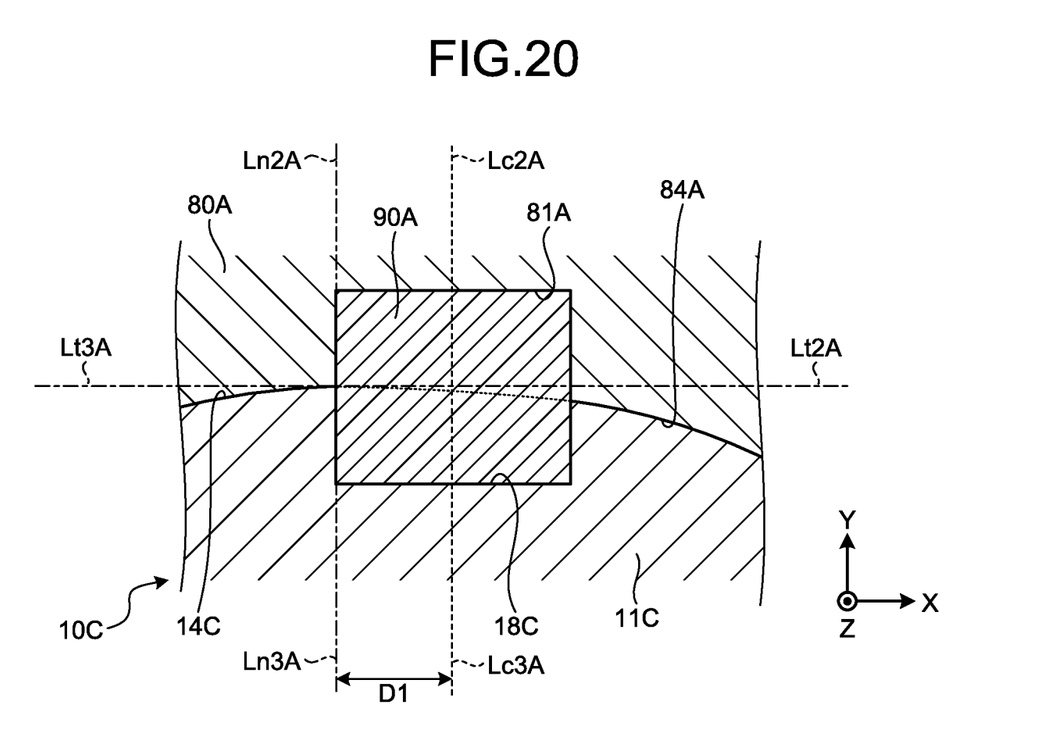
FIG. 20 is a schematic cross-sectional view of a fitting portion between a rotor and a rotary shaft of a rotary electric machine illustrated in FIG. 19.

Thus, when a rotational center of the rotor 10C is disposed to overlap a rotational center of the rotary shaft 80A, the centerline Lc3A is aligned with the centerline Lc2A. As illustrated in FIG. 20, the key 90 disposed in the recess 81A in the rotary shaft 80A can be precisely fitted in the recess 18C.

Additionally, the resolver 1C including the rotor 10C can be prevented from being erroneously mounted, using the key 90, on a rotary electric machine that includes a rotary shaft in which the recess 81A having the centerline aligned with the normal line Ln2A is formed, as with the resolver 1B according to the third embodiment.

It is noted that, as with the protrusion 12 described previously, various changes can be made with the recess 18C. For example, the position, number, and shape of the recess 18C may be changed as with the position, number, and shape of the recess 18B described above.

As described above, the rotor 10C in the fourth embodiment includes the annular rotor main unit 11C and has the recess 18C. The recess 18C extends inward the rotor main unit 11C from the outer circumference 14C of the rotor main unit 11C. The key 90 disposed in the recess 81A in the rotary shaft 80A fits in the recess 18C. The recess 18C is formed at a position at which the centerline Lc3A is offset in parallel with respect to a normal line Ln3A that is associated with a tangent line Lt3A of the outer circumference 14C in the rotor main unit 11C. The foregoing arrangements prevent the resolver 1C from being erroneously mounted, using the key 90, on a rotary shaft that has a recess having a centerline aligned with the normal line Ln2A.

The present invention can achieve a rotor and a resolver capable of preventing erroneous mounting with respect to a rotary shaft of a rotary electric machine.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A rotor to be mounted on a rotary shaft of a rotary electric machine, the rotor comprising:
    an annular rotor main unit;
    a first fitting portion that extends inward or outward from one of an inner circumference and an outer circumference of the rotor main unit, the first fitting portion being a first protrusion or first recess; and
    a second fitting portion that extends inward or outward from the one of the inner circumference and the outer circumference of the rotor main unit, the second fitting portion being a second protrusion or second recess, wherein
    a centerline of the first fitting portion and a centerline of the second fitting portion are offset in parallel with respect to a normal line that is associated with a tangent line of the one of the inner circumference and the outer circumference of the rotor main unit, the normal line being a straight line that passes through a rotational center of the rotor,
    the centerline of the first fitting portion and the centerline of the second fitting portion are offset from the normal line in the same direction by substantially the same distance, and
    the centerline of the first fitting portion extends in a same direction that the first fitting portion extends inward or outward from the one of the inner circumference and the outer circumference of the rotor main unit.

2. The rotor according to claim 1, wherein the first fitting portion of the rotor is configured to be connected with a first fitting portion of the rotary shaft, and the second fitting portion of the rotor is configured to be connected with a second fitting portion of the rotary shaft.

3. The rotor according to claim 1, wherein:
    the first fitting portion extends inward or outward from the one of an inner circumference and an outer circumference of the rotor main unit in a first direction, and
    the second fitting portion extends inward or outward from the one of the inner circumference and the outer circumference of the rotor main unit in a second direction that is opposite to the first direction.

4. A rotor to be mounted on a rotary shaft of a rotary electric machine, the rotor comprising:
    an annular rotor main unit;
    a first fitting portion that extends inward or outward from one of an inner circumference and an outer circumference of the rotor main unit, the first fitting portion being a first protrusion; and
    a second fitting portion that extends inward or outward from the one of the inner circumference and the outer circumference of the rotor main unit, the second fitting portion being a second protrusion, wherein a centerline of the first fitting portion and a centerline of the second fitting portion are offset in parallel with respect to a normal line that is associated with a tangent line of the one of the inner circumference and the outer circumference of the rotor main unit, the normal line being a straight line that passes through a rotational center of the rotor, the centerline of the first fitting portion and the centerline of the second fitting portion are offset from the normal line in the same direction by substantially the same distance, and the centerline of the first fitting portion extends in a same direction that the first fitting portion extends inward or outward from the one of the inner circumference and the outer circumference of the rotor main unit.

5. The rotor according to claim 4, wherein the first fitting portion of the rotor is configured to be connected with a first fitting portion of the rotary shaft, and the second fitting portion of the rotor is configured to be connected with a second fitting portion of the rotary shaft.

6. The rotor according to claim 4, wherein:

the first fitting portion extends inward or outward from the one of an inner circumference and an outer circumference of the rotor main unit in a first direction, and the second fitting portion extends inward or outward from the one of the inner circumference and the outer circumference of the rotor main unit in a second direction that is opposite to the first direction.

7. A rotor to be mounted on a rotary shaft of a rotary electric machine, the rotor comprising:

an annular rotor main unit;

a first fitting portion that extends inward or outward from one of an inner circumference and an outer circumference of the rotor main unit, the first fitting portion being a first recess; and a second fitting portion that extends inward or outward from the one of the inner circumference and the outer circumference of the rotor main unit, the second fitting portion being a second recess, wherein a centerline of the first fitting portion and a centerline of the second fitting portion are offset in parallel with respect to a normal line that is associated with a tangent line of the one of the inner circumference and the outer circumference of the rotor main unit, the normal line being a straight line that passes through a rotational center of the rotor, the centerline of the first fitting portion and the centerline of the second fitting portion are offset from the normal line in the same direction by substantially the same distance, and the centerline of the first fitting portion extends in a same direction that the first fitting portion extends inward or outward from the one of the inner circumference and the outer circumference of the rotor main unit.

8. The rotor according to claim 7, wherein the first fitting portion of the rotor is configured to be connected with a first fitting portion of the rotary shaft, and the second fitting portion of the rotor is configured to be connected with a second fitting portion of the rotary shaft.

9. The rotor according to claim 7, wherein:

the first fitting portion extends inward or outward from the one of an inner circumference and an outer circumference of the rotor main unit in a first direction, and the second fitting portion extends inward or outward from the one of the inner circumference and the outer circumference of the rotor main unit in a second direction that is opposite to the first direction.

* * * * *